May 13, 1969     G. F. KREMM     3,443,991
PROCESS FOR PICKLING METAL
Filed Dec. 6, 1965
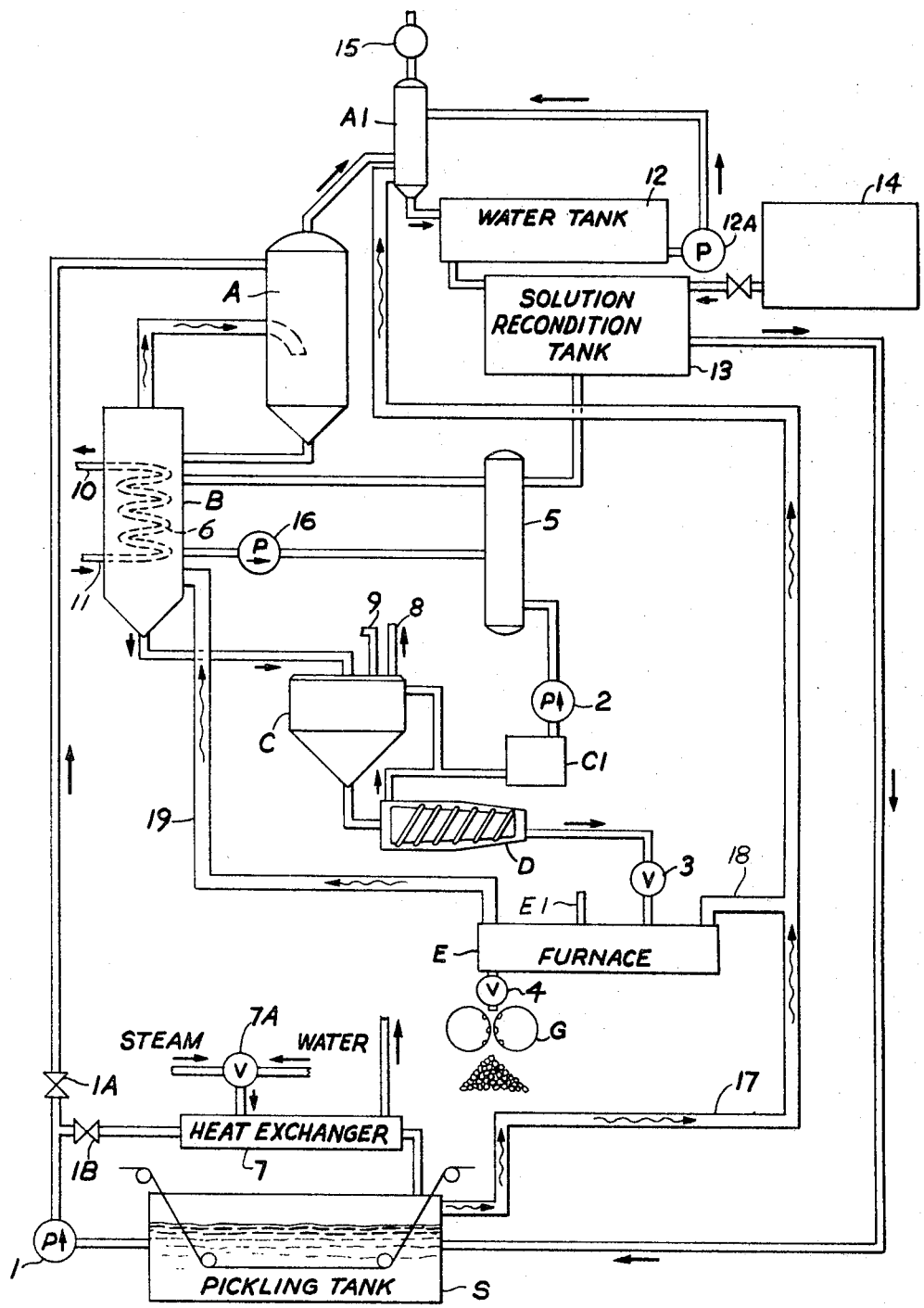
INVENTOR.
GEORGES F. KREMM
BY
ATTORNEY United States Patent Office 3,443,991
Patented May 13, 1969

3,443,991
PROCESS FOR PICKLING METAL
Georges F. Kremm, 10 E. Erie St., Chicago, Ill. 60611; Virginia Kremm, executor of said Georges F. Kremm, deceased
Filed Dec. 6, 1965, Ser. No. 511,761
Int. Cl. B08b 3/08, 3/04
U.S. Cl. 134—3                                  8 Claims

ABSTRACT OF THE DISCLOSURE

A continuous cyclic process for pickling iron, steel and alloys thereof, and recovering iron from the used pickling solutions wherein a portion of used pickling solution comprising hydrochloric acid and iron chloride is removed from a pickling tank through which the metal is being passed, the used pickling solution is passed counter current to hydrochloric acid vapors in an absorber to absorb hydrochloric acid so as to raise the chloride concentration, then into a chiller vessel to lower the temperature and bring about crystallization and deposition of hydrous iron chloride crystals, separating the iron chloride crystals from the mother liquid, and depositing them in a furnace where the crystals are heated and reduced with hydrogen or other reducing agent to iron and hydrogen chloride, recovering the iron, passing the hydrogen chloride gas into the absorber, and recycling the mother liquor to maintain a substantially uniform and chemically active pickling solution by the addition only of make-up acid and water in sufficient amount to offset dragout and fume losses.

This invention relates to a process of "pickling" or "descaling" iron, steel and alloys thereof, with a solution of hydrochloric acid and metal salts, and more particularly to a process wherein the pickling solutions are continuously withdrawn from the pickling tanks and reconditioned by the removal from the solution of the dissolved elemental metal and oxides which constitute the removed scale and the regeneration of the acid content of the pickling solution whereby the process can be carried on indefinitely and controlled under near optimum conditions of speed and minimal cost of make-up acid. The only acid required for indefinite metal cleaning being that small amount necessary to offset unrecovered fume losses and dragout. The elemental metal and oxides removed by the chemical reactions occurring in the pickling process will, in this method, be retrieved as high purity elemental iron or a combination of oxides and metallics.

In the past it has been customary to clean the surface of the metal by pickling for the most part by immersion in a solution of sulfuric acid ($H_2SO_4$) at varying temperatures below 210° F.

The $H_2SO_4$ solution attacked the metal and the underlying FeO, forming ferrous sulfate, free hydrogen and water. The virtually insoluble $Fe_2O_3$ and $Fe_3O_4$ of the outer layers were lifted or popped off. In many high speed installations the immersion was preceded by stretching the metal in a temper mill or scale breaker to speed the pickling rate. However, even at temperatures above 200 deg. F. the pickling rate declined rapidly as the dissolved iron increased. The procedure customarily involves the periodical addition of make-up acid and frequent dumping of used solution and replacement by fresh acid; thus the acid, metal and heat energy losses were heavy and the thermal shock caused deterioration to tanks. The disposal of the spent liquor and control of fumes has constituted a series economic and polluting problem.

In this invention inhibited hydrochloric acid (HCl) and iron chlorides in solution comprise the pickling solution. The iron oxides of the scale are soluble in the HCl, forming $FeCl_2$ and $FeCl_3$, the latter apparently in a simultaneous reaction being reduced to $FeCl_2$ in the presence of elemental iron.

In the process a portion of the hydrous iron chloride equal to that being formed in the pickling function is crystallized within the system and thence decomposed in a muffle furnace in a *reducing atmosphere*.

The gaseous products of the decomposition reported as hydrochloric acid and water vapors are absorbed within the system in an absorber by the continuously circulating pickle liquor, which is well below the saturation point at the temperature of the absorber. The solid products of the decomposition are recaptured as iron, iron oxide, or a combination of the two, depending upon the extent to which the reduction is carried. The purity of the extracted products is controllable and the products are valuable. Thus the process offers the possibility of producing powdered iron of the highest purity at reasonable cost, as a by-product of ferrous metal pickling.

Customarily in continuous pickling of ferrous metal a film of pickling solution of approximately $\frac{1}{1000}$ inch in thickness is carried out to be lost in the rinse water, creating an economic loss as well as contributing to waste pollution problems.

In order to reduce losses in continuous pass lines of the chlorides of the pickling solution by dragout—the finishing end of the pickling tanks will be equipped with squeegee wipers, wringer rolls or a combination of both, arranged in a V or chevron, in such a manner that the surface film of solution is both wiped and plowed off within the tanks. The wringer preferably to be motor mechanized to revolve so that the roll faces would move opposite to the direction of the moving metal strip, sheet, etc., the rolls to be made of a rubber elastomer or similar material and have a doctor blade fixed transversely on the surface of the rolls—preferably less than 180° from point of contact of roll with moving metal, the purpose being to improve the efficiency of the rolls, thereby reducing solution dragout.

After original system charge the only make-up acid required is the small amount sufficient to offset dragout and unrecoverable fume losses. Thus the high cost of hydrochloric acid is reduced and a valuable recovered by-product takes the place of the cost and risk of waste disposal. Uniform pickling solutions facilitate throughput speed, improve the quality of the treated metal and promote longer tank life by lessening thermal shock.

In consequence of the continuous reconditioning and recirculating of the pickling solution and the extraction therefrom, a produced, of the dissolved metal scale, its temperature, acid, and iron salt concentration can be controlled. The pickling rate thus can also be regulated to achieve optimum metal throughput and a reduction of downtime, a particular advantage where continuous sheet or strip is being pickled. The reconditioned pickling solution tank in this process is of sufficient capacity to contain the solution of the entire system—thus system solutions need not be dumped during downtime or repair time and wide variations in concentration are readily avoided.

An object of the invention is to provide an economic process for pickling metal articles.

Another object is to provide a hydrochloric acid and iron chloride process for pickling metal, which results in less elemental metal loss than similar heretofore used.

A further object is to provide a hydrochloric and iron chloride pickling process for ferrous metal, in which process the effective characteristics of the pickling solution are being constantly maintained by recovering and retaining in the system the chlorine from the hydrous iron chloride as hydrochloric acid and the retrieval of the dissolved metallic scale as a valuable by-product, thereby reducing the high cost of hydrochloric acid, the cost and risk of waste disposal and achieving a pollution abatement.

A further object of the invention is to abate the pollution of air and water and eliminate waste disposal problems.

A further object is to provide a hydrochloric acid and iron chloride pickling process wherein the pickling solution is maintained at substantially a constant concentration level by continuously separating a portion of the hydrous iron chloride of the solution, decomposing the crystals by heating in a reducing atmosphere, reabsorbing the resultant HCl and $H_2O$ vapors in the system and withdrawing the metal, or metal and oxides in a solid state.

A further object is the recovery of all the iron dissolved in the pickling process in the form of powdered iron, iron oxide for furnace feed or a higher purity iron oxide for use as pigment.

A further object is promotion of long pickle tank life by maintenance of uniform temperatures and reduction of thermal shock.

A further object is to increase the throughput speed of the metal pickling process.

A further object is to provide an efficient system substantially closed.

Other objects and advantages of the invention will become apparent as the following example and detailed descriptions progress, reference being had to the accompanying schematic drawings.

The desired temperature of the pickle bath and the concentration of acid and iron salts therein for optimum speed and effective pickling is maintained by this method wherein the pickle solution is continuously restored within the system and recirculated through tank 13 the capacity of which should preferably be great enough to store the entire volume of solution in the system.

The temperature in the pickling tanks is controlled by regulator valves 7-A for steam and cooling water supplied to heat exchanger 7, connected to the pickle tanks. The major portion of the solutions withdrawn from pickle tank S by pump 1 passes through this heat exchanger 7 and reenters the tank S through one or a plurality of inlets. This procedure embodies the means of maintaining the desired constant pickle bath temperature and the means to create turbulence in the pickling tanks for the promotion of pickling activity.

The control for uniform concentration of the pickling solutions in this invention is achieved mainly by regulating the temperature of the chiller-crystallizer C. For example, to lower the concentration of the said pickling solution, reduction of the amount of coolant water through the heat exchanger by way of inlet 9 permits the temperature of the pickling solution in crystallizer C to rise, thereby increasing the solubility characteristics of the solution and effecting reduction in the rate of crystal formation, and the ensuing decomposition, gas absorption, and metal withdrawal. Contrawise, a lowering of the temperature of the solution in the crystallizer decreases its chloride solubility, resulting in greater crystal fall-out for decomposition furnace feed.

Adjustment of concentration to offset dragout and fume losses is accomplished by adding to system—preferably through tank 13, make-up acid or water. The reconditioned pickling solution supplied to pickling tank S from tank 13 will have a higher acid content and lower ferrous chloride content than the solution in the pickling tanks so the concentration at the pickling tank inlet will have a higher chemical activity at the early point of metal immersion. The high recirculation of solution propelled by pump 1 rapidly brings about uniformity within all but a small area of the pickling tank. Multiple pickling tanks may be supplied individually or in series by gravity or through use of booster pumps.

As an example of the pickling solution concentrations and the temperatures which preferably may be maintained, the aqueous solution entering the pickling tank S from reconditioned solution tank 13 may have a temperature of 110° F. and be by weight 18.5% hydrochloric acid and 12.75% ferrous chloride, while the used solution leaving the pickling tank S may be at 145° F. and will have a lower acid and a higher ferrous chloride content—say 15% hydrochloric acid and 18% ferrous chloride.

Periodic manual removal of silica, carbon and other solids that accumulate in the pickling tanks is preferable, but continuous removal can be achieved by installation of a centrifuge or hydrocone (not shown) but so arranged that a portion of the recirculation solution containing solids in suspension from the tank S can be by-passed at high velocity by pump 1 for centrifugal removed of the solids and the return of the clarified liquor to the pickling tanks.

In a preferred application of the process a portion of used pickle liquor is withdrawn from tank S at a temperature of—say 115° F. to 160° F. by pump 1 and passed successively through metered by-pass valves 1-A, thence through packed tower scrubber A, to and through absorber B wherein the now unsaturated solutions descend counter to rising HCl gases and water vapors through duct 19 as gaseous decomposition products from furnace E, more fully described hereinafter. These gases and vapors are condensed and absorbed by the unsaturated solutions descending through absorber B. The HCl gas entering the absorber B from the decomposer will consist of substantially fifty percent hydrogen chloride. Its absorption raises the chloride concentration and the temperature of the descending solution. The temperature within absorber B is regulated by the passing of cooling water through inside heat exchanger coils 6 by way of inlet 11. The cooling effluent leaves the system through outlet 10.

The schematic drawing illustrates an additional heat exchanger 5, connected to absorber B for heat dissipation and its recovery in solution tank 13. The coolant (temperature 50° to 85° F.) for heat exchanger 5 is the reconditioned pickle liquor derived from chiller C, and centrifuge D by the way of pump tank C1, and propelled by pump 2 through exchanger 5 to the reconditioned solution tank 13. The hot, fortified pickle solution to be cooled in absorber B is circulated by pump 16.

Scrubber A is connected by a vent duct from absorber B from which it may receive break-through gaseous fumes, vapors and entrained moisture particles. Any products rising through this vent duct are washed by the unsaturated aqueous pickle solution from pump 1, descending through vessel A to absorber B.

Final scrubber A-1 is a conventional scrubbing tower and mist remover, equipped with an exhauster for negative pressure. It receives any break-through gases from scrubber A, also fumes containing HCl and water vapors in addition to incondensables from the pickling tank S through fume duct 17. Tank 12 is originally charged with water which is circulated through scrubber 1-A by means of pump 12-A from tank 12. This water circulated through scrubber 1-A picks up HCl, $H_2O$ vapors and any other condensables that report from scrubber A and fume duct 17. The condensate passes from bottom of vessel 1-A to tank 12, which has an overflow line to tank 13 where it, comingled with the reconditioned pickle solution, returns through a metered valve (not shown) to the pickling tank S.

In chiller vessel C the used pickling solution, now fortified in absorber B by absorption of HCl from the decomposing furnace, the temperature is reduced to a range of 50 to 85° F. by means of a heat exchanger (not shown), through which cooling water is introduced through inlet 9 and returned through outlet 8. The fortified solution at the lowered temperature is supersaturated and crystals of iron chloride form rapidly so that a crystalline slurry can readily be withdrawn through a valve (not shown) from the cone bottom and passed on to a conventional horizontal filter or preferably fed into a centrifuge D. It has been determined that centrifuging at 2000 times gravity reduces the free moisture in the hydrous iron chloride to less than five percent by weight. From the centrifuge D the hydrous iron chloride cake is passed through a rotary valve 3 to the decomposition furnace E, electrically energized or indirectly heated by oil or gas, with a range of 150 to 700° C.—composed preferably of a tube of monel metal or Inconel wherein a motor driven stepped pitch serrated flight conveyor turns and propels the charge of iron chloride cake at a diminishing rate from the inlet to the discharge port area of the furnace. The enclosing shell of the furnace, the material of construction of which is corrosion resistant and insulating, such as asbestos, and is of close dimensional conformity with the tube—the preferred free space area less than fifteen cubic feet. In addition to the feed inlet the decomposition tube shall have a plurality of outlet ports on the top thereof, to permit the emergence of the gaseous products of the decomposition. At a point about midway from either end of the top of the decomposition tube, the small tubing E-1 permits the introduction of a metered volume of hydrogen or other reducing gases. The introduction of these reductants inhibits the undesired evolution of chlorine and promotes the production of HCl gases which, along with the $H_2O$ vapor, now rise through duct 19 for recovery in absorber B. The solid products of the decomposition in the reducing atmosphere are principally iron or Wustite (FeO) and elemental iron. By introducing additional hydrogen or other reductants the solids are reduced to pure iron. The solids are continuously discharged through rotary valve 4 into an inert atmospheric chamber for cooling or briquetting G. If, by preference, the hot solids are well aerated upon discharge they become pyrophoric and oxidize to higher oxides. They can thus in this manner be oxidized for sale or as pigments. The volume of introduced hydrogen is easily regulated for production of iron, ferrous oxide, or a combination thereof. The reactions in the decomposition furnace E may vary widely with the furnace residence time and the feed volume of hydrogen gas at E-1.

By supplying hydrogen in stoicheiometric quantity at inlet E-1 to the heat dissociation of the ferrous chloride tetrahydrate in the decomposition furnace, the chlorine freed from the iron combines with the hydrogen and as hydrogen chloride gas rises through duct 19 to the absorber B. The free elemental iron now leaves the furnace E by way of a discharge duct controlled by a gas tight rotary valve 4 as an iron powder. The reaction in the furnace may be expressed as:

$$FeCl_2 \cdot 4H_2O + H_2 + heat \rightarrow 2HCl + 4H_2O + Fe$$

This reaction is readily controlled by temperature regulation and the balancing of hydrogen supplied. By completely excluding all oxidants and introducing hydrogen or other reductants in the decomposition furnace an environment is provided wherein no free chlorine is evolved and no iron sublimates are formed. Further, the higher iron oxides cannot form or exist in this reducing atmosphere to become entrained in the gas stream or foul equipment.

Thus it is observed that the operator may readily control the decomposition of hydrous ferrous chloride to produce a pure iron by the addition of substantially one pound of hydrogen to ninety-nine pounds of ferrous chloride tetrahydrate in the decomposition furnace below 700° C., depending upon time element. The products of the decomposition will be substantially 36 lbs. of hydrogen chloride as a gas and 36 lbs. of water as a vapor—the latter two reporting through duct 19 to absorber B, and 28 lbs. of iron, which will leave the decomposition furnace through gas tight rotary valve 4 to briquetter G or to containers. Cooling for packaging or briquetting of the iron powder or combination of iron and iron oxide must be done in an inert atmosphere unless higher oxides are desired.

The accompanying illustration does not show the source of hydrogen. Hydrogen may be purchased or manufactured in a conventional producer or reformer. The preferred source, however, is on site supply by cracking and reforming natural or other hydrocarbon gas of high methane ($CH_4$) content, mixing this gas with a stoichiometric amount of steam, thence passing the mixture through a catalytic retort, preferably employing nickel oxide as the catalyst, the retort to be externally heated to the best reforming temperature for the gases employed and material of retort construction, and to be determined by trial—the temperature range is normally between 1750° F. and 2200° F. The reaction is endothermic and yields approximately 70% $H_2$ and 25% CO. Nitrogen and unreacted input gas make up the balance. Introducing this gas through metered valves (not shown) to decomposition furnace at inlet E-1 in varying amounts—from a trace to stoichiometric volume, depending upon whether iron powder or iron oxide is desired, as the metallic product of the ferrous chloride decomposition. Unreacting or incondensable fractions of gas evolving from the decomposition will pass through duct 19 to and through absorber B, scrubbers A and A-1 and be exhausted by exhauster 15 to stack and will not constitute a pollution problem. The amount of hydrogen required is thus seen to vary from a trace to one percent of the weight of the ferrous chloride crystals decomposed, depending upon the characteristics of the metallic by-product desired.

The decomposition furnace need not conform to the description of the described apparatus. It may be constructed of corrosion resistant material similar to a conventional wedge furnace, with one or more trays upon which the hydrous ferrous chloride is propelled from the feed port to the discharge port by mechanically actuated rabbles regulated to allow sufficient residence time of the feed in the apparatus to effect the decomposition. The heat may be supplied electrically or indirectly by controlled fuel combustion. The atmosphere must be reducing and kept supplied with an amount of hydrogen or hydrogen mixed with other reductants or inert gases suitable to the preference of the operator for obtaining iron powder, iron oxide, or a mixture at the discharge port. Both the feed inlet ducts and the duct for discharge of the solid product must be equipped with gas tight rotary valves to protect the decomposition area from the intrusion of any oxidants. The partial conversion of the hydrous iron chloride solids to HCl gas and $H_2O$ vapor in the decomposition will create sufficient pressure to propel these gaseous vapors through the open duct 19 to absorber B. Also available are atmosphere controlled furnaces that can be easily adapted to the required decomposition function.

The results of 40 laboratory muffle furnace tests, decomposing ferrous chloride tetrahydrate crystals containing an average two percent by weight of free water at temperatures beginning at 90° C. and rapidly increasing to 600° C.—introducing meanwhile 1% hydrogen gas of 99.9% purity into the furnace chamber in a 20 test group of the experiments. The reaction gases within 20 minutes that reported to the collector were condensed. Analysis of condensate disclosed average 52% $H_2O$ and 48% HCl. The solid residue was a fine gray-black powder, analyzing 99.9 Fe.

Results of 9 Group B tests employing reformed natural gas as the reductant and 11 Group C tests are set forth below.

MUFFLE FURNACE TESTS—WT. TO NEAREST GRAM

Group B—9 Tests—20 Min.

| Wt. Sample | Recovered Condensate | | Solids | |
|---|---|---|---|---|
| | HCl | H₂O | Fe | FeO |
| 200 g. FeCl₂·4H₂O<br>4 g. H₂O (free)<br>3 g. Reformed gas<br>(70% H₂-29% CO) | 72 | 78 | 56 | |

Group C—11 Tests—44 Min.

| | | | | |
|---|---|---|---|---|
| 200 g. FeCl₂·4H₂O<br>4 g. H₂O (free)<br>.1 g. H₂ gas | 72 | 60 | 2 | 70+ |

Thus it is demonstrated that the introduction of the stoichiometric amount of hydrogen required to convert all the chlorine released in the decomposition of ferrous chloride is an essential factor in the production of high purity iron instead of iron oxide.

For a better understanding of the invention, an example of a typical continuous strip pickling operation of sixty tons an hour (43,200 tons a month) of metal strip throughput is set forth in rounded figures below—reference being made to the illustrations herewith.

BASIS

Aqueous pickling solution: 15% HCl-18% FeCl₂.
60 tons/hr. continuous strip pickling at 145° F.
Immersion time: 24 seconds.
Total tank length: 140′.
Pass line speed: 350′/min.

| | Lbs./ton | As percent of metal | Lbs./hr. |
|---|---|---|---|
| Wt. of Scale removed (as Fe₃O₄) | 10 | .50 | 600 |
| Wt. of Iron removed (as Fe) | 2 | .10 | 120 |
| Total Wt. removed (as Fe) | 10 | .50 | 600 |
| Wt. HCl (anhydous) required | 13 | .63 | 775 |
| Wt. FeCl₂ produced | 22.5 | 1.125 | 1,350 |
| Wt. FeCl₂·4H₂O produced | 35.4 | 1.77 | 2,125 |
| Wt. Reaction H₂O produced | 3 | .15 | 180 |
| Wt. Hydrogen | .38 | | 23 |
| Wt. Dragout loss: HCl+FeCl₂ as 800 sq. ft. at .001″ film (Anhy. HCl) | 1.29 | | 77.4 |

THROUGH RECONDITIONING SYSTEM—1 HOUR (a) Withdrawn from pickle tank S: 800 g.p.m. solution 15% HCl-18% FeCl₂ at 145° F.
(b) Recycled through heat exchanger 7: 760 g.p.m. returned to pickle tank S.
(c) To reconditioning area through bypass 7–A: 40 g.p.m. (25,200 lbs./hr.).
(d) To scrubber A: 40 g.p.m. from scrubber A to absorber B: 40 g.p.m. (25,200 lbs./hr.), 15% HCl-18% FeCl₂ at 145° F.
(e) In absorber B: 775 lbs. HCl+775 lbs. H₂O absorbed at 145° F.
(f) Through crystallizer C: 42.5 g.p.m. (26,760 lbs.) 17% FeCl₂.
(g) Through centrifuge D: 26,760 lbs. (7127 lbs. as FeCl₂·4H₂O (26.6%+)).
(h) From centrifuge D: 39 g.p.m. (24,660 lbs.) mother liquor 18.5% HCl-12.75% FeCl₂ at 65° F. to tank 13 for reuse.
(i) From centrifuge D: 2125 lbs. FeCl₂·4H₂O crystals as cake.
(j) To decomposition furnace E: 2125 lbs. FeCl₂·4H₂O (150° to 600° C.).
(k) To decomposition furnace E: 23 lbs. H₂ (150° to 600° C.).
(l) From decomposition furnace E: (150° to 600° C.) to absorber B: 775 lbs. HCl (gas) +775 lbs. H₂O vapor).
(m) From decomposition furnace E through rotary valve 4: 600 lbs. as Fe to inert cooling chamber.

This example assumes a preference for recovery of iron powder. Accordingly a slight excess of hydrogen was introduced into the decomposition furnace. A lesser amount of available free hydrogen or equivalent hydrogen and other reducing gases would result in the production of iron oxide or a combination of iron and oxide—the desired product being controlled by regulating the amount of reducing gas introduced, the temperature of the furnace and the feed residence time.

The pickling solution balance is maintained by regulating the temperature of the chiller—crystallizer C at the connected heat exchanger, thereby controlling the rate of ferrous chloride crystal formation. The reconditioned pickling solution tank 13 has adequate capacity. Thus the desired concentration of pickling solution can readily be kept within close limits—firstly, by the aforesaid temperature regulation of crystallizer C; secondly, uniform long range balances are maintained by controlling the flow of solution to the reconditioning area at valves 1–A. Thirdly, other imbalances in concentration from dragout and fume losses or otherwise, are adjusted by adding make-up acid from supply tank 14 and water, both introduced into main reconditioned pickle solution tank 13 for gradual correction.

The dragout varies inversely with the mass to surface ratio and varies further with the efficiency of the squeegee and wringer rolls. In the continuous pickling example the dragout loss and unrecovered fume loss is considered to be 10% of the HCl. This is represented substantially by loss of pickling solution reporting to rinsing area as 15% HCl and 18% FeCl₂ equivalent to 25% HCl in the pickling solution.

This process is a closed circuit with the exception of fractional diversion of iron salt and HCl in the dragout and loss of HCl in unrecovered fumes. The inhibitors, with the same proportionate exception, are retained in the system for re-use.

The pickling line and solution reconditioning system is constantly at or near atmospheric pressure and entails no evaporative processes nor the introduction of oxidants.

From the examples stated and the accompanying illustrative diagram it will be observed that (1) desired operational temperature of the pickle bath is regulated by means of heat exchanger 7; (2) concentration of the pickling solution is regulated by heat exchanger connected to chiller-crystallizer C and valves to make-up acid and water lines, and (3) the proportion of used pickle liquor continuously withdrawn for circulation through the reconditioning area may be adjusted at by-pass valves 1–A, which volumetrically will always be equal to the reconditioned pickle solution returned from tank 13 to pickling tank S through a metered valve (not shown) in illustrated supply line, and (4) the characteristics and purity of the metallics continuously retrieved as a by-product can be controlled by the proportion of hydrogen introduced to the decomposition furnace through valve E–1. Periodic reference to pickle tank S and recondition pickle solution will enable an operator to achieve the economies of optimum system balance, or by conventional instrumentation all the functions of this pickling process can be brought under direct digital control and thus the inherent cost advantages of desired operating temperatures and concentrations of the pickle bath can be realized.

For high speed continuous pickling of strips or sheets of characteristics similar to the example, a pickling rate— say of 2000 ft. a minute can be achieved through use of one, but preferably multiple pickling tanks of a total length of 800 ft. Optimum immersion time for a particular product can best be determined by trial. Under variant circumstances and scale conditions, the temperature and the pickling solution concentration can be varied, also the effective immersion time can be regulated above or below the 24 second time of the given example.

While preferred modifications of the invention have been described to explain the underlying principles of

I claim:
1. In a process of pickling metallic articles of iron, steel and the alloys thereof with an aqueous solution of hydrochloric acid and iron chloride, and continuously reconditioning the used solution acid by regeneration of the acid, the steps of:
   (a) passing a stream of pickling solution continuously in contact with the metallic articles thereby forming a used pickling solution,
   (b) continuously concentrating a portion of the used pickling solution by the absorption therein of hydrogen chloride gas,
   (c) cooling the concentrated pickling solution to supersaturation to produce hydrous iron chloride crystals and mother liquor,
   (d) separating the hydrous iron chloride crystals from the mother liquor,
   (e) decomposing said crystals in a furnace in the presence of a reducing gas into hydrogen chloride gas and metallic solids,
   (f) recovering the hydrogen chloride gas so formed and withdrawing the metallic by-product of the iron chloride crystal decomposition,
   (g) using the recovered hydrogen chloride gas in step (b), and
   (h) recycling the mother liquor as reconditioned pickling solution thereby maintaining a substantially uniform and chemically active pickling solution by the addition only of make-up acid and water in sufficient amount to offset dragout and fume losses.

2. The process according to claim 1 wherein the iron chloride crystals are decomposed at temperatures ranging from 150°–750° C. in the presence of hydrogen.

3. In the process of pickling steel and the like with an aqueous solution of iron chloride and hydrochloric acid, the steps of:
   (a) passing a stream of pickling solution in contact with metal being pickled, thereby forming a used pickling solution,
   (b) reconditioning the used solution by continuously cooling a portion thereof,
   (c) separating therefrom a portion of the formed iron chloride crystals,
   (d) decomposing said crystals by heat in presence of free hydrogen to hydrogen chloride gas and iron, and
   (e) returning the reconditioned used solution to the process system.

4. In a process of pickling metallic articles of iron, steel and alloys thereof, the steps of:
   (a) passing the metal articles through a pickling solution of aqueous hydrochloric acid and iron chloride in a tank,
   (b) withdrawing therefrom a portion of the pickling solution,
   (c) reducing the temperature thereof to precipitate iron chloride crystals,
   (d) separating the crystals from the mother liquor,
   (e) heating the separated crystals in the presence of free hydrogen to decompose them into hydrogen chloride gas, water vapor and iron or iron oxide,
   (f) withdrawing the metallics, and
   (g) introducing the hydrogen chloride into the withdrawn pickling solution before the removal therefrom of the iron chloride crystals.

5. The process according to claim 4 wherein the concentration of said aqueous solution of hydrochloric acid and iron chloride are restored after use by regulating the rates of formation of ferrous chloride crystals, of withdrawal of the crystals of the decomposition thereof, the return of the reformed hydrochloric acid to the system, the removal from the system of the iron product of the decomposition and further, by the addition of water and hydrochloric acid to said solution.

6. The process according to claim 4 wherein the pickling solution withdrawn from the tank ranges from 1%–15% of the tank capacity each minute and there is separated for reconditioning a proportion of said withdrawn pickle solution ranging up to 15% of the solution, the major portion of the originally withdrawn used pickle liquor being passed through a heat exchanger, said heat exchanger being constantly supplied with steam and a coolant by which means the temperature of the circulating used pickle solution can be maintained or varied as desired prior to said solution being passed for reentry through an orifice into the pickling tank, thereby providing means for regulation of temperature in the pickle bath and creating a turbulence to promote and accelerate the chemical activity of the pickling solution.

7. In a process of pickling iron and steel and the alloys thereof by immersion with an aqueous solution of hydrochloric acid and iron chloride, the improvement of continuously restoring the concentration of the pickling solution which comprises the steps of:
   (a) withdrawing a portion of the used solution,
   (b) fortifying this used solution by absorption of hydrogen chloride gas produced by hydrogen reduction of ferrous chloride in the process,
   (c) cooling the fortified solution to a point sufficient to effect crystallization and thence
   (d) removing the ferrous chloride crystals and
   (e) decomposing said crystals in a reducing atmosphere of hydrogen within a heated furnace and
   (f) recovering the hydrogen chloride gas so produced to effect the solution fortification and thence
   (g) withdrawing from the decomposition furnace the solids produced with the hydrogen chloride gas during the decomposition of the crystals, and
   (h) offsetting fume and dragout losses by addition of hydrochloric acid and water.

8. In a process of pickling iron, steel and the alloys thereof with an aqueous solution of hydrochloric acid and iron chloride comprising steps for reclaiming acid and metal, wherein ferrous chloride crystals are produced and then decomposed in a reducing atmosphere in a heated furnace, the improvement of:
   (a) introducing natural gas in combination with essentially a stoichiometric mixture of steam through a mixing valve into a furnace heated to within a range of 1700° to 2200° F.,
   (b) passing said mixture of gas and steam through a catalyst such as nickel oxide, thereby cracking and reforming said mixture to produce a product gas of essentially 70% hydrogen, 25% carbon monoxide and 5% nitrogen and unreacted components, and
   (c) then passing the reformed gas into the decomposition furnace to create the reducing atmosphere.

References Cited

UNITED STATES PATENTS

| | | | |
|---|---|---|---|
| 1,980,809 | 11/1934 | Levy | 23—154 X |
| 2,592,580 | 4/1952 | Loevenstein | 23—154 X |
| 2,709,143 | 5/1955 | Francis et al. | 134—13 |
| 2,886,420 | 5/1959 | Jones et al. | 156—19 |
| 3,310,435 | 3/1967 | Robinson et al. | 134—3 |

OTHER REFERENCES

C.A. 58: P11001a, (1963).
C.A. 49: 4492c (1955).

MORRIS O. WOLK, *Primary Examiner.*

SIDNEY MARANTZ, *Assistant Examiner.*

U.S. Cl. X.R.

134—10, 11, 12, 13; 156—19; 23—154